March 24, 1959
C. E. HURLBURT
2,878,678
GYROSCOPE
Filed May 9, 1956
FIG. 1
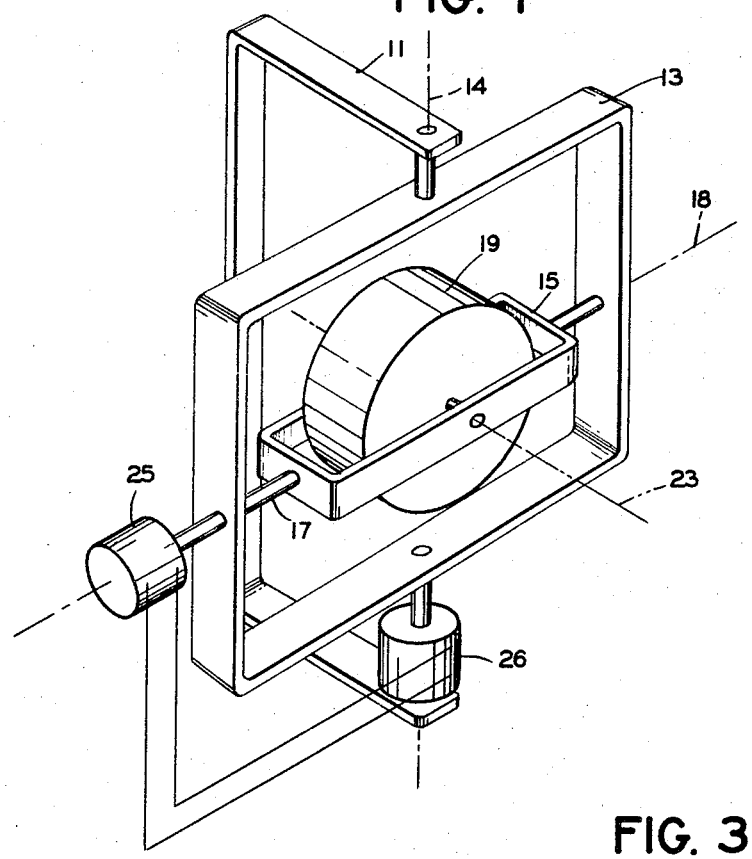
FIG. 2
FIG. 3
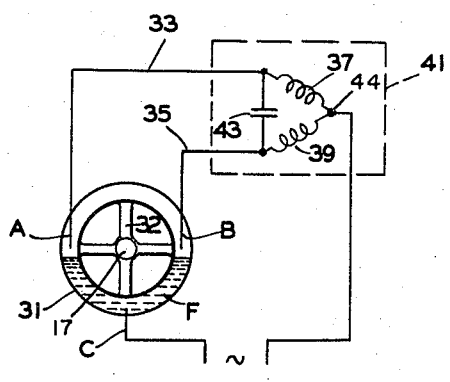
INVENTOR.
CHARLES E. HURLBURT
BY
Oscar B Brumback
ATTORNEY ବ
United States Patent Office 2,878,678
Patented Mar. 24, 1959

2,878,678

GYROSCOPE

Charles E. Hurlburt, River Edge, N.J., assignor to Bendix Aviation Corporation, Teterboro, N.J., a corporation of Delaware Application May 9, 1956, Serial No. 583,877

1 Claim. (Cl. 74—5.41)

This invention relates generally to gyroscopes and more particularly to a gyroscope having apparatus for maintaining the spin axis of a gyroscope in a desired position.

A conventional gyroscope comprises a rotor mass adapted to spin at high speed about an axis which is mounted in inner and outer gimbal rings. The inner gimbal ring is mounted in the outer gimbal ring for rotation about an axis which is normally perpendicular to the spin axis, and the outer gimbal is mounted on the craft for rotation about a second axis also normally perpendicular to the spin axis. The rotor of a directional gyroscope, for example, spins about a normally horizontal spin axis in a case constituting an inner gimbal which is journalled by normally horizontal trunnions in an outer gimbal for rotation about a horizontal axis while the outer gimbal is journalled by trunnions on the craft for rotation about a vertical axis.

As is well known in the gyroscope art, to precess the spin axis of the gyroscope about one axis, a torque must be applied at an axis at perpendicular angle to the first axis. Thus, for example, to maintain the spin axis of a directional gyroscope in a horizontal position, a torque is applied about the vertical axis. Conventional practice has been to mount liquid level switches on the various gimbal rings to sense the tilting of the gimbal from a desired position and energize a corresponding precessing device to return the gimbal to the desired position.

In conventional liquid level switches, a fluid such as mercury amalgam or electrolyte moves from one position in the switch to another as the gimbal is tilted. This has presented difficulties because as the gyro tilts, the liquid (which has a finite mass) of the switch moves a finite distance to engage a contact. This movement of the liquid from center provides a moment of force which creates a torque about one axis of the gyroscope so as to cause precession about another axis. For example, if such a switch be mounted on the normally horizontal gimbal of a directional gyroscope, a tilting about the horizon causes the switch to tilt and operate a precessing device to apply a torque about the vertical axis to restore the gimbal ring to a level horizontal position. At the same time, however, the movement of the fluid in the switch tends to cause a torque or movement about the horizontal axis and precess the gyro about the vertical axis; the latter precession would appear as a change in azimuth of the craft when no change had actually occurred.

An object of the present invention, therefore, is to provide a novel device for sensing the deviation of the spin axis of a gyroscope from a desired position about an axis without creating a torque about this axis.

Another object of the invention is to provide a novel arrangement for maintaining the spin axis of a gyroscope in a desired position about an axis wherein the deviation from the desired position is detected by the movement of contacts relative to a liquid and the center of gravity of the liquid is always in the plane of the dynamic vertical passing through the support for the axis so as to produce no moment arm about the axis.

The present invention contemplates a gyroscope having a first gimbal rotatable about a first axis in a second gimbal which is rotatable about a second axis in a base, a gyroscope rotor mounted in the first gimbal for rotation about a spin axis, and precessing means for applying a torque to the second axis to correct for any deviation of the spin axis relative to the first axis, and provided with a liquid switch for detecting deviation of said first gimbal wherein the liquid switch is generally circular and mounted concentrically with the first axis so as to exert no torque thereon upon movement of the first gimbal.

The foregoing and other objects and advantages of the invention will appear more fully hereinafter from a consideration of the detailed description which follows, taken together with the accompanying drawing wherein two embodiments of the invention are illustrated by way of example. It is to be expressly understood, however, that the drawing is for illustration purposes only and is not to be construed as defining the limits of the invention.

In the drawing wherein like parts are marked alike:

Fig. 1 illustrates schematically a directional gyroscope incorporating the novel detection and position maintaining system of the present invention;

Fig. 2 illustrates one embodiment of the invention; and

Fig. 3 illustrates a second embodiment of the invention.

Turning now to Fig. 1, the invention is illustrated as incorporated in a directional gyroscope for purposes of simplicity. The gyroscope comprises a case 11 mounted on the craft, an outer gimbal ring 13 journalled in case 11 for freedom of movement of ring 13 about the vertical axis 14, an inner gimbal ring 15 journalled in ring 13 by trunnions 17 for movement about a normally horizontal axis 18, and a gyroscopic rotor 19 which is caused to spin about a normally horizontal axis 23 (by conventional means not shown).

In accordance with the present invention, a liquid switch 25 is mounted on trunnions 17 so as to be concentric with the sensitive axis 18 of the gyro. The switch comprises a container of generally circular and ring shaped configuration so as to confine a liquid within the container. Thus, although the trunnions 17 may rotate in gimbal ring 13, the center of gravity of the liquid is always on the plane of the dynamic vertical passing through axis 18. Thus, a deviation of the spin axis of the rotor from the horizontal does not exert a moment arm on the gyro since the liquid remains in its original position. The switch container moves relative to the liquid but no additional moment is created since no mass is displaced a distance from the center or axis 18. Upon a displacement of the spin axis from vertical, switch 25 operates a device 26 to apply a torque about axis 14 to restore spin axis 23 to the horizontal.

Fig. 2 shows one embodiment of the invention wherein a hollow glass ring 31 is fixed to trunnion 17 in a suitable manner as by clips or spoke like elements 32 positioned in balanced relation and projecting radially from a free end of the trunnion 17. Spaced at the top portions of ring 31 are two electrodes A and B and at the bottom of the ring is a third electrode C. Through suitable leads 33 and 35 electrodes A and B are connected to the field windings 37 and 39 of a conventional induction motor 41 which, in response to excitation, exerts a torque about the vertical axis 14 of gimbal 13.

A suitable capacitor 43 maintains the excitation of the windings in a substantially quadrature relationship. Electrode C and the common junction 44 of windings 37 and 39 are connected to a suitable source of alternating current. The fluid F may be a suitable current conducting fluid such as a mercury amalgam or an electrolyte.

In the operation of the embodiment of Figure 2, displacement of spin axis 23 from the horizon will cause fluid F to engage one contact A or B so as to complete a circuit from the source of alternating current through windings 37 and 39. This energization of windings 37 and 39 causes motor 41 to exert a torque about the axis of gimbal 13 in a direction to cause the gyroscopic rotor to precess to a horizontal position. It will be apparent that the position of the fluid F is constant despite a rotation of the shell ring 31. Thus, movement or tilting of the spin axis of the gyroscope creates no additional torque on the gyro to cause the gyroscope to precess about its vertical axis.

Fig. 3 shows another embodiment of the invention wherein electrodes X and Y are positioned at one side of ring 51 which is adapted to be secured to trunnion 17. Fluid Z is always in contact with electrode X and when a deviation of the gyroscoue occurs in one direction, electrode Y moves into contact with fluid Z so as to complete a circuit between electrodes X and Y.

The torque motor 56 in the embodiment of Figure 3 includes three field windings 57, 58, and 59. Excitation is always applied to windings 57 and 58 thereby tending to cause a torque to be exerted on the vertical axis and precess the gyro in one direction. Winding 59, however, is wound in opposition to winding 58 and exerts twice the torque of winding 58. Thus, when fluid Z engages electrode Y, a circuit is completed from X to Y to energize winding 59 and overcome the torque of winding 58 so as to torque the gyroscope in the opposite direction. The fields of windings 58 and 59 are maintained in quadrature relationship with winding 57 by suitable means not shown.

The foregoing has presented a novel arrangement for maintaining the spin axis of a gyroscope in a normal position without exerting an additional torque on the gyro when a deviation from the normal position occurs. The invention has been shown as incorporated in a directional gyroscope to maintain the spin axis in a horizontal position. It is readily apparent that invention may also be used in a similar manner to maintain the spin axis of a vertical gyro erect with respect to the pitch and bank axes, i.e., the switch being mounted on the pitch and bank axes trunnions and the torque motors being mounted on appropriate pitch and bank axes for control by the switches.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

In a gyroscope of the type including a first gimbal having a first axis, a second gimbal, a trunnion affixed at one end to said second gimbal and supporting the second gimbal in said first gimbal for movement of said second gimbal about a second axis normally perpendicular to said first axis, a rotor mounted in said second gimbal and having a spin axis perpendicular to said first and second axes, precessing means for applying a torque to said first axis whereby the spin axis of said rotor precesses about said second axis, and detecting means responsive to a deviation of said spin axis relative to the vertical of the earth for operating said precessing means to correct for said deviation; the improvement in which said trunnion has a free end projecting through said first gimbal and said detecting means comprises a circular tubular member, spoke like elements for mounting the circular tubular member at the free end of the trunnion, said elements projecting radially in balanced relation from the free end of said trunnion so as to mount the circular tubular member directly on said trunnion exteriorly of said first gimbal and concentric with said second axis, contacts positioned in balance relation in said circular tubular member, and a current conducting fluid in said circular tubular member for selectively closing a circuit through said contacts whereby said fluid, spoke like elements and contacts have a common center of gravity on the plane of the dynamic vertical passing through the second axis so as to be ineffective to exert a moment of force about said second axis upon said deviation of the spin axis.

References Cited in the file of this patent
UNITED STATES PATENTS

| | | |
|---|---|---|
| 2,044,343 | Angeloni | June 16, 1936 |
| 2,456,619 | Curry | Dec. 21, 1948 |
| 2,645,942 | Hurlburt | July 21, 1953 |

FOREIGN PATENTS

| | | |
|---|---|---|
| 144,982 | Australia | Feb. 5, 1952 |

OTHER REFERENCES

Ser. No. 381,604, Lauck (A.P.C.), published May 4, 1943.